United States Patent
Joshi et al.

(10) Patent No.: US 9,083,075 B2
(45) Date of Patent: Jul. 14, 2015

(54) FIRST COUPLING TRANSFORMER SECONDARY WINDING COUPLING SECOND TRANSMITTER TO ANTENNA

(75) Inventors: Alok Prakash Joshi, Thane (IN); Gireesh Rajendran, Bangalore (IN); Apu Sivadas, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 521 days.

(21) Appl. No.: 13/197,798

(22) Filed: Aug. 4, 2011

(65) Prior Publication Data
US 2013/0034088 A1 Feb. 7, 2013

(51) Int. Cl.
| H01Q 1/24 | (2006.01) |
| H04B 7/26 | (2006.01) |
| H04W 72/04 | (2009.01) |

(52) U.S. Cl.
CPC ............. *H01Q 1/246* (2013.01); *H04B 7/2643* (2013.01); *H04W 72/0446* (2013.01)

(58) Field of Classification Search
CPC .. H04B 7/2643; H04W 72/0446; H01Q 1/246
See application file for complete search history.

(56) References Cited

U.S. PATENT DOCUMENTS

| 5,428,602 | A | * | 6/1995 | Kemppainen | 370/330 |
| 5,703,565 | A | * | 12/1997 | Herring | 340/572.7 |
| 5,752,198 | A | * | 5/1998 | Frichtel et al. | 455/524 |
| 7,120,456 | B1 | * | 10/2006 | Elliot et al. | 455/517 |
| 8,498,201 | B2 | * | 7/2013 | Budampati et al. | 370/221 |
| 2007/0066222 | A1 | * | 3/2007 | Tao et al. | 455/41.2 |
| 2009/0125746 | A1 | * | 5/2009 | Rofougaran | 713/400 |
| 2011/0068636 | A1 | * | 3/2011 | Lee et al. | 307/115 |
| 2011/0111708 | A1 | * | 5/2011 | Tu et al. | 455/82 |
| 2011/0235600 | A1 | * | 9/2011 | Sun et al. | 370/329 |
| 2011/0263214 | A1 | * | 10/2011 | Robinson et al. | 455/88 |
| 2011/0267154 | A1 | * | 11/2011 | Carroll et al. | 333/103 |
| 2012/0076173 | A1 | * | 3/2012 | Chang et al. | 375/132 |

* cited by examiner

*Primary Examiner* — Hassan Phillips
*Assistant Examiner* — Lonnie Sweet
(74) *Attorney, Agent, or Firm* — Lawrence J. Bassuk; Charles A. Brill; Frank D. Cimino

(57) ABSTRACT

A device includes multiple transceivers, a coupling block and an antenna. The transceivers operate according to time-division multiple access (TDMA) techniques. The coupling block is designed to enable the multiple transceivers to transmit or receive corresponding signals using the antenna. The multiple transceivers include a first transmitter and a second transmitter. The first transmitter is connected to the antenna via a first coupling network. The second transmitter is connected to the antenna via a series connection of a second coupling network and at least a portion of the first coupling network. Other transmitters are connected to the antenna via a series arrangement of at least a portion of the first coupling network and corresponding coupling networks.

21 Claims, 4 Drawing Sheets

FIRST COUPLING TRANSFORMER SECONDARY WINDING COUPLING SECOND TRANSMITTER TO ANTENNA

BACKGROUND

1. Technical Field

Embodiments of the present disclosure relate generally to wireless communication devices, and more specifically to enabling multiple transceivers operated according to time-division multiple access (TDMA) techniques to transmit and receive using a single antenna.

2. Related Art

As is well-known in the relevant arts, TDMA refers to a multiple-access technique in which only one transmitter-receiver pair contained in multiple pairs of transmitters and receivers communicates with another transmitter-receiver pair in a time slot. Each transmitter-receiver pair is allocated time slots in which to transmit and receive signals. The transmitter and receiver of a transmitter-receiver pair may communicate with each other over a wireless medium (channel).

Systems, devices and integrated circuits (IC) often contain multiple transceivers. A transceiver, as is well-known, may include a transmitter and a receiver, and can thus transmit as well as receive signals. It is often desirable for reasons such as for example, implementation complexity and size, cost, etc., to use a single antenna to enable the multiple transceivers contained in a system, device or IC to transmit and receive signals over a wireless medium. Each of the multiple transceivers may be designed to transmit or receive in a time-division multiple access (TDMA) fashion using the single antenna.

It is often desirable that the specific topology and/or the circuits (coupling network) used to connect each of the transceivers to the antenna satisfy requirements such as the need for only a minimal number of components used for effecting the connections, minimal insertion loss (i.e., minimal degradation in signal-to-noise ratio of the corresponding signal) due to the topology and coupling network, smaller implementation area and lower complexity of the design, etc. Typically, prior techniques employ a multiplexer to connect the transceivers to the antenna. The prior technique may require a large number of control signals to control operation of the multiplexer, may be associated with unacceptable levels of insertion loss, and may therefore not be desirable at least for such reasons. Further, in environments such as when the transceivers are all contained within a same IC, the multiplexer may need to be provided external to the IC, may consume large board-space on a printed circuit board (PCB), and such an approach may not be desirable at least in space-constrained applications.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A device includes an antenna, a first transmitter and a second transmitter. The first transmitter is designed to generate a first transmit signal on a first output node. The first output node is coupled to the antenna via a first coupling network. The second transmitter is designed to generate a second transmit signal on a second output node. The second output node is coupled to the antenna via a series connection of a second coupling network and at least a portion of the first coupling network. The first transmitter and the second transmitter operate according to time-division multiple access (TDMA) techniques.

Several embodiments of the present disclosure are described below with reference to examples for illustration. It should be understood that numerous specific details, relationships, and methods are set forth to provide a full understanding of the embodiments. One skilled in the relevant art, however, will readily recognize that the techniques can be practiced without one or more of the specific details, or with other methods, etc.

BRIEF DESCRIPTION OF THE VIEWS OF DRAWINGS

Example embodiments will be described with reference to the accompanying drawings briefly described below.

The drawing in which an element first appears is indicated by the leftmost digit(s) in the corresponding reference number.

DETAILED DESCRIPTION

Various embodiments are described below with several examples for illustration.

1. Example Device

Figure 1:
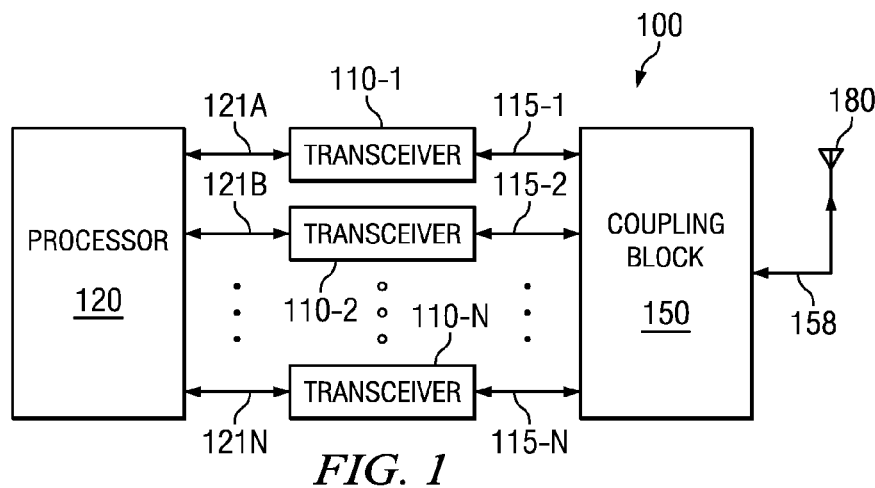
FIG. 1 is a block diagram illustrating the details of an example device in which several embodiments can be implemented.

FIG. 1 is a block diagram illustrating the details of an example device in which several embodiments can be implemented. Device 100, which may for example correspond to a mobile phone, is shown containing transceivers 110-1 through 110-N, processor 120, coupling block 150 and antenna 180. The specific blocks of FIG. 1 are shown merely by way of illustration, and device 100 may be implemented to contain more or fewer blocks and/or components.

Processor 120 generates, on respective paths 121A-121N, corresponding baseband signals to be transmitted by corresponding transmitters in transceivers 110-1-110-N. Processor 120 receives, on paths 121A-121N, corresponding baseband signals extracted from corresponding signals received via antenna 180 by corresponding receivers in transceivers 110-1-110-N. The baseband signals may be in digital or analog form. Each of paths 121A-121N may thus represent separate transmit and receive paths. Although not shown, processor 120 may be connected to input and output interfaces to enable a user to provide inputs to and receive outputs from device 100. In general, processor 120 operates, in conjunction with the rest of the blocks of FIG. 1, to provide or enable various user applications such, as for example, voice and data communications.

Transceivers 110-1 through 110-N operate in a time-division multiplexed mode (TDMA). Thus, only one of transceivers 110-1-110-N may receive or transmit a signal via antenna 180 in any time interval/slot. Further, a transceiver may only either transmit or receive (but not both) in a time slot. Each of transceivers 110-1-110-N may contain a transmit processing chain (transmitter) and a receive processing chain (receiver). Transceivers 110-1-110-N are connected to coupling block 150 via paths 115-1-115-N respectively.

The transmitter of transceiver 110-1 processes the baseband signal(s) received on path 121A to generate a modulated signal on path 115-1. The modulated signal provided on path 115-1 represents a 'final' signal in the transmit processing chain contained in transceiver 110-1, and is transmitted via coupling block 150 and antenna 180. The processing operations performed by the transmitter of transceiver 110-1 may include modulation of a carrier by the baseband signal received on path 121A, up-conversion of the modulated signal, filtering, power amplification etc. The receiver of transceiver 110-1 processes a modulated signal received on path 115-1 (via antenna 180 and coupling block 150) to extract the baseband signal contained in the modulated signal. The processing operations performed by the receiver of transceiver 110-1 may include amplification, down-conversion and demodulation of the modulated signal received on path 115-1. The receiver provides the baseband signal to processor 120 on path 121A. Each of the other transceivers 110-2-110-N is implemented in a manner similar to that described above with respect to transceiver 110-1 (but consistent with the corresponding technology or standard such as WLAN, bluetooth, etc), and operates to transmit and receive corresponding signals.

Thus, the signals (in corresponding time slots) on paths 115-1 through 115-N represent either corresponding modulated signals to be transmitted (in the respective time slots) via antenna 180 or corresponding modulated signals received (in the respective time slots) via antenna 180. In an embodiment, transceiver 110-1 is a wireless local area network (WLAN) transceiver, and signals on path 115-1 are consistent with corresponding WLAN standards. In the embodiment, transceiver 110-2 is a bluetooth transceiver, and signals on path 115-2 are consistent with bluetooth standards. Transceivers 110-3-110-N may correspond to WLAN, bluetooth or other types of transceivers. In other embodiments the transceivers may be implemented differently.

Coupling block 150 is designed to enable transceivers 110-1 through 110-N to transmit or receive (in corresponding TDMA time slots) using antenna 180, and is shown connected to antenna 180 via path 158. In embodiments of the present disclosure, coupling block 150 may be implemented such that there is minimal insertion loss, and employs a relatively small number of circuit components.

2. Coupling Topology

Figure 2:
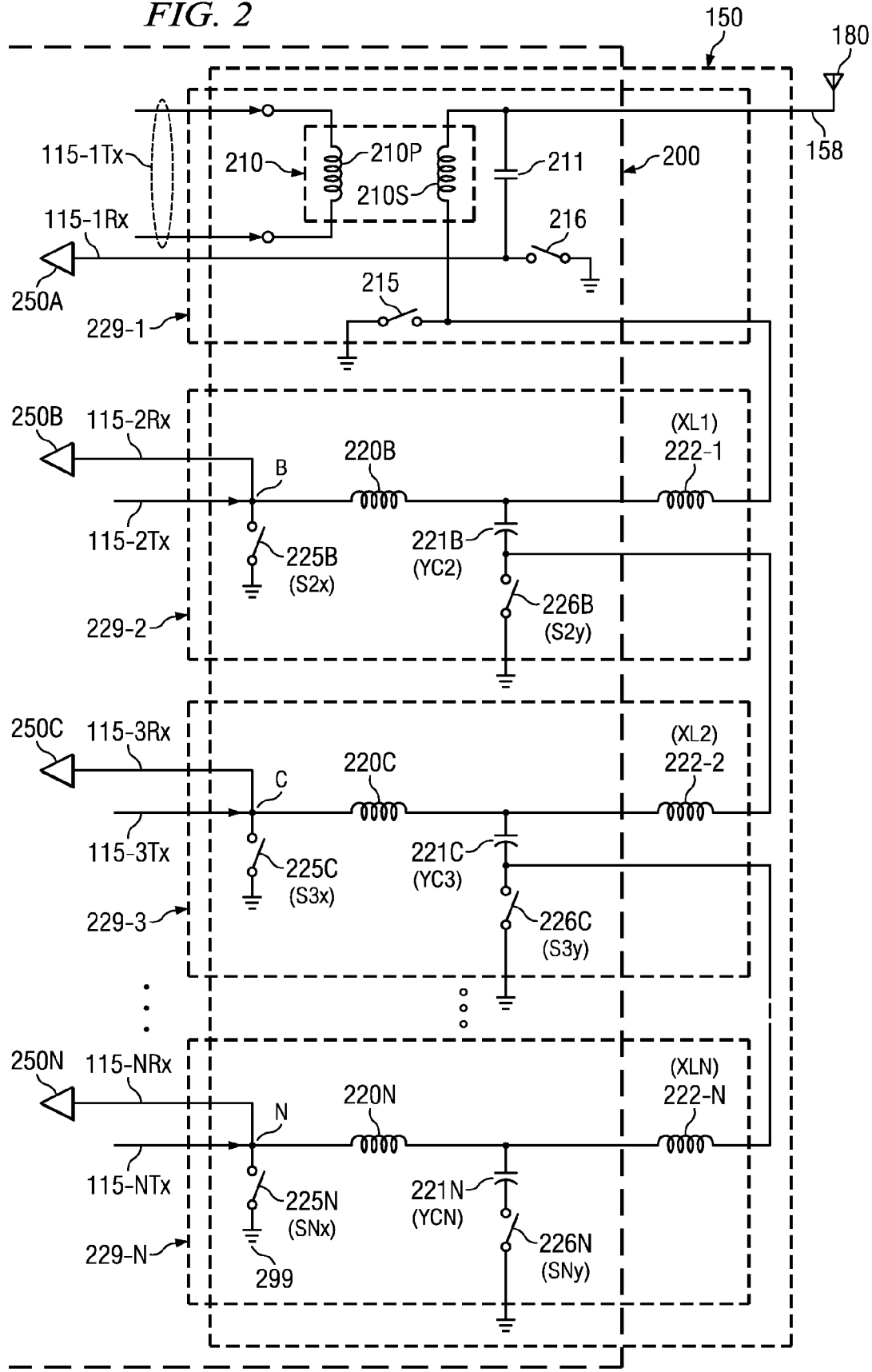
FIG. 2 is a diagram illustrating the manner in which multiple transceivers are connected to transmit and receive via a same antenna, in an embodiment.

FIG. 2 is a diagram illustrating the manner in which transceivers 110-1 through 110-N of FIG. 1 are connected to transmit and receive via antenna 180, in an embodiment. The implementation details of coupling block 150 of FIG. 1 are shown in greater detail in FIG. 2. In the embodiment illustrated in FIG. 2, transceivers 110-1-110-N, processor 120, and the circuit portions shown enclosed by dotted region 200 are implemented in integrated circuit (IC) form (and hence referred to conveniently as IC 200). Although shown external to IC 200, inductors 222-1 through 222-N may be implemented either as discrete components external to IC 200, or on-chip within IC 200. Antenna 180 may be implemented external to IC 200. Terminal 299 represents a ground terminal. Although not shown in FIG. 2 in the interest of clarity, control signals for closing and opening of the switches of FIG. 2 are provided by processor 120 (FIG. 1).

Nodes/paths 115-1Tx through 115-NTx represent the output nodes of the respective transmitters (for example, the output of power amplifiers contained in the respective transmitters) contained in transceivers 110-1 through 110-N. Paths 115-1RX through 115-NRx represent the input paths to respective receivers (for example, the input of respective low-noise amplifiers (LNA) in the respective receivers) contained in transceivers 110-1 through 110-N. Paths 115-1TX and 115-1RX of FIG. 2 are deemed to be contained in path 115-1 of FIG. 1. Similarly, paths (115-2Tx, 115-2RX) through (115-NTx, 115-NRx) are deemed to be contained in respective paths 115-2 through 115-N of FIG. 1.

Coupling block (or coupling network) 150 is shown containing transformer 210, switch 215, switch 216, capacitor 211, switches 225B (S2x) through 225N (SNx), inductors 220B through 220N, capacitors 221B through 221N, switches 226B (S2y) through 226N (SNy) and inductors 222-1 through 222-N. Also shown contained in IC 200 are low-noise amplifiers (LNA) 250A through 250N.

The primary and secondary windings of transformer 210 (which operates as a Balun) are shown marked as 210P and 210S respectively. Transformer 210 converts the differential output of the transmitter of transceiver 110-1 into single-ended form. Node 115-1Tx (first output node) is connected to antenna 180 via a first coupling network (229-1) formed by transformer 210, switches 215 and 216, and capacitor 211.

Switches 225B and 226B, inductors 220B and 222-1, and capacitor 221B constitute another coupling network (second coupling network 229-2). Node 115-2Tx is connected to antenna 180 via a series connection of the second coupling network and the parallel arrangement of secondary windings 210A and capacitor 211. Thus, and as may be observed from FIG. 2, node 115-2Tx (second output node) is connected to antenna 180 via a series connection of the second coupling network and a portion of the first coupling network.

Switches 225C and 226C, inductors 220C and 222-2, and capacitor 221C constitute another coupling network (third coupling network 229-3). As may be observed from FIG. 2, node 115-3Tx is connected to antenna 180 via a series connection of the third coupling network, a portion of the second coupling network and a portion of the first network.

Switches 225N and 226N, inductors 220N and 222-N, and capacitor 221N constitute the $N^{th}$ coupling network 229-N. Node 115-NTx is connected to antenna 180 via a series connection of coupling network 229-N and portions of the preceding coupling networks $(N-1)^{th}$ through the first coupling network).

The output sections (e.g., respective power amplifiers) of the respective transmitters of transceivers 110-1-110-N may be powered down in time slots in which the corresponding transmitters do not transmit.

Figure 3A:
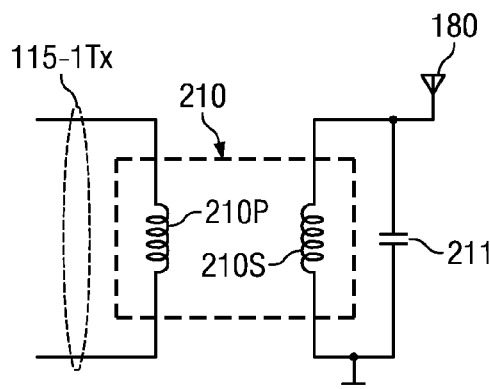
FIG. 3A is a diagram representing the transmission path between a transmitter and an antenna, in an embodiment.

In operation, in time slots in which the transmitter of transceiver 110-1 is to transmit, switches 215 and 216 are closed, and the corresponding equivalent circuit of the transmit path of the transmitter of transceiver 110-1 is shown in FIG. 3A. It may be observed that none of the other coupling networks load the output of the transmitter of transceiver 110-1. Balun 210 serves as a matching network for the transmitter of transceiver 110-1.

Figure 3B:
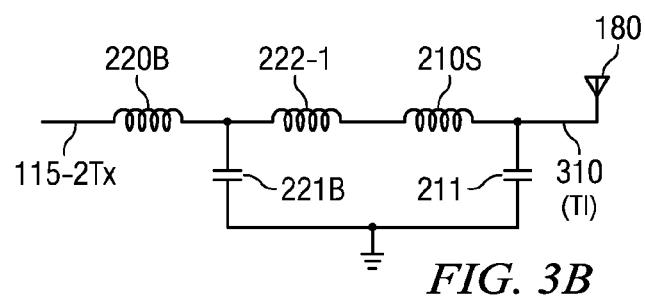
FIG. 3B is a diagram representing the transmission path between another transmitter and an antenna, in an embodiment.

In time slots in which the transmitter of transceiver 110-2 is to transmit, switches 216 and 226B are closed and switches 215 and 225B are open, and the corresponding equivalent circuit of the transmit path of the transmitter of transceiver 110-2 is shown in FIG. 3B. Inductor 222-1, secondary winding 210S, capacitors 211 and 221B form a matching network for matching path 115-2 to the impedance of the transmission line (noted as 310(T1) in FIG. 3B) connected to antenna 180. The values of inductance 222-1 and capacitance 211 may be selected to achieve a desired impedance (typically 50 ohms) for the matching network formed by inductor 222-1, secondary winding 210S and capacitor 211. Due to switch 226B being closed, coupling networks 229-3 through 229-N are effectively removed from coupling block 150, and therefore do not load the output of the transmitter of transceiver 110-2.

Figure 3C:
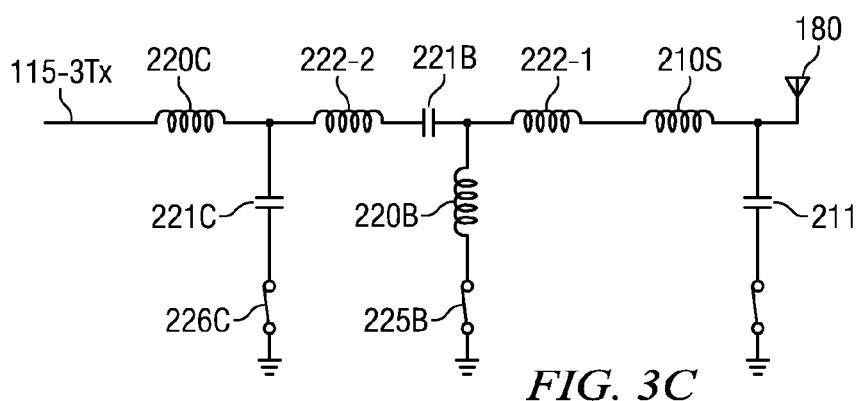
FIG. 3C is a diagram representing the transmission path between yet another transmitter and an antenna, in an embodiment.
Figure 4A:
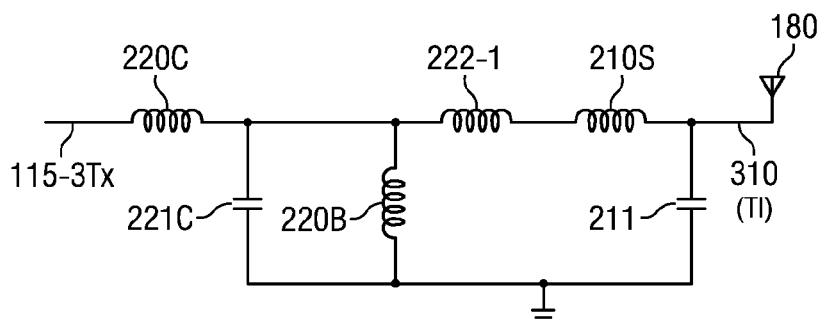
FIG. 4A is an equivalent circuit of the circuit of FIG. 3C, in an embodiment.
Figure 4B:
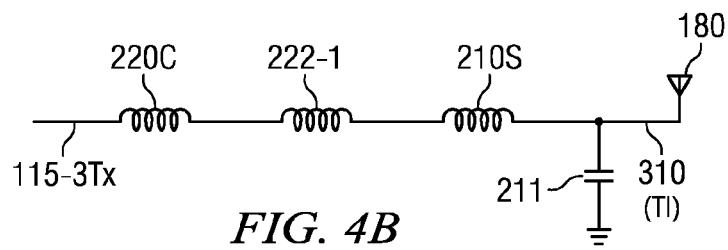
FIG. 4B is an equivalent circuit of the circuit of FIG. 4A, in an embodiment.

In time slots in which the transmitter of transceiver 110-3 is to transmit, switches 225B and 226C are closed, and switches 226B and 225C are open, and the corresponding equivalent circuit of the transmit path of the transmitter of transceiver 110-3 is shown in FIG. 3C. Inductor 222-2 and capacitor 221B are implemented to have respective inductance and capacitance values such that the equivalent impedance of the series connection of inductor 222-2 and capacitor 221B equals zero in the frequency band of transmissions of transmitter of transceiver 110-3. Therefore, the circuit of FIG. 3C reduces to that of FIG. 4. Again, inductor 222-1, secondary winding 210A and capacitor 211 form a matching network for matching the impedance of the transmission line (noted as 310(T1) in FIG. 4) connected to antenna 180.

In an embodiment, capacitor 221C and inductor 220B are designed with respective capacitance and inductance values such that in the transmit frequency band of interest of transceiver 110-3, capacitance of capacitor 221C and inductance of inductor 220B are in shunt resonance. As a result, the parallel combination of capacitance of capacitor 221C and inductance of inductor 220B equals an open circuit, and the circuit of FIG. 4A reduces to that of FIG. 4C. Inductor 220C is provided to protect the transmitter of transceiver 110-3 during transmissions of transmitter of transceiver 110-4.

In an embodiment, inductors 220B through 220N are all implemented with the same inductance value XLa. Representing inductances of inductors 222-1 through 222-N respectively as XL1 through XLN, admittances of capacitors 221B through 221N respectively as YC2 through YCN, the following relationships are maintained in the embodiment:

$$XL(i-1) = -1/YC(i-1) \text{ (for all } i>2)\qquad \text{Equation 1}$$

$$YCi = YC2 - [(i-2)/XLa] \text{ (for all } i>2)\qquad \text{Equation 2}$$

wherein 'i' is an index ranging from 1 to N.

Thus, for example, for 'i' equaling 3 (corresponding to the third coupling block 229-3), the following relationships are obtained from Equation 1 and Equation 2:

$$XL2 = -1/YC2\qquad \text{Equation 3}$$

$$YC3 = YC2 - 1/XLa\qquad \text{Equation 4}$$

Due to XL2 equaling (−1/YC2), the series connection of inductor 222-2 and capacitor 221B has an impedance equal to zero in the transmit frequency (or frequency band) of the transmitter of transceiver 110-3, as noted above with respect to FIG. 3C. Further, due to Equation 4, the impedance at node C looking in the direction of the transmission path from node C to antenna 180 is equal to the impedance at node B looking in the direction of the transmission path from node B to antenna 180.

Denoting the transmitters of transceivers 110-3 through 110-N respectively as transmitter-3 through transmitter-N, the state of switches of control block 150 in corresponding transmission time slots of transmitter-i (i ranging from 3 to N) are as follow:

switch 215 is open,
switch 216 is closed,
switch Six is open,
switch Siy is closed,
switches S2x through S(i−1)x are closed,
switches S2y through S(i−1)y are opened, and
states of all other switches are "don't care".

As an example, when transmitter-3 is to transmit, the states of the switches as noted above results in an equivalent transmission path as shown in FIG. 3C. Further, due to Equation 3, the circuit of FIG. 3C reduces to that of FIG. 4.

Figure 5A:
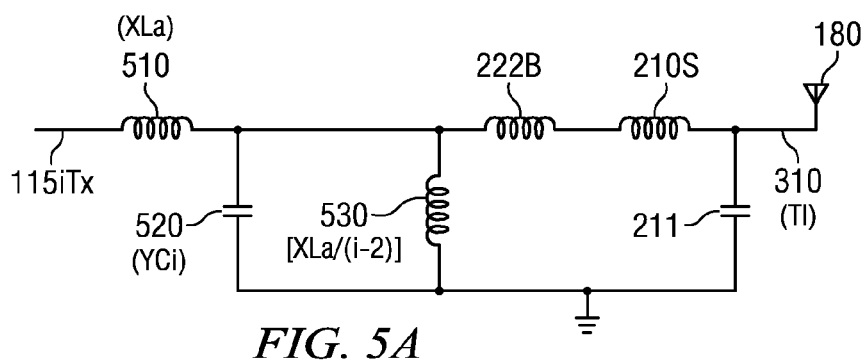
FIG. 5A is a circuit diagram representing corresponding transmission paths between a set of transmitters and an antenna, in an embodiment.
Figure 5B:
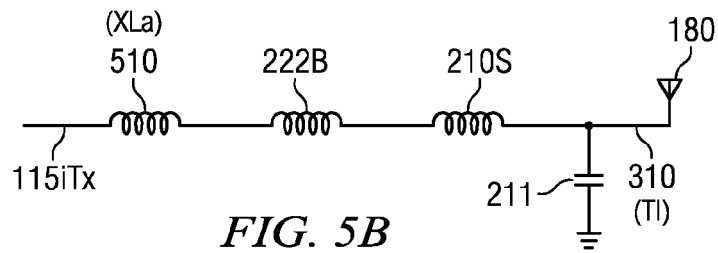
FIG. 5B is an equivalent circuit of the circuit of FIG. 5A, in an embodiment.

FIG. 5A is a circuit diagram representing the corresponding transmission paths between each of the transmitters of transceivers 110-3-110-N and antenna 180. Inductor 510 of FIG. 5 represents the corresponding one of inductors 220C through 220N. In FIG. 5, the index 'i' ranges from 3 to N. Thus, index 'i' equals 3 when the circuit of FIG. 5 is to represent the transmission path between node 115-3Tx and antenna 180, equals 4 when the circuit of FIG. 5 is to represent the transmission path between node 115-4Tx and antenna 180, and so on. Inductor 510 represents the corresponding one of inductors 220B through 220N depending on the value of 'i'. Capacitor 520 represents the corresponding ones of capacitors 221B through 221N. Inductor 530 has an inductance equal to XLa/(i-i-2). Thus, for example, when index i equals 3, inductor 530 has a value XLa/(3−2), i.e., XLa.

In an embodiment, capacitance YCi and inductance [XLa/i−2)] are designed to be in shunt resonance in the transmit frequency band of interest of transmitter-i. As a result, the parallel combination of capacitance YCi and inductance [XLa/i−2)] equals an open circuit, and the circuit of FIG. 5A reduces to that of 5B. Inductor XLa (510) is provided to protect transmitter-i transmissions of transmitter of transmitter-1+1.

Due to the relationships of Equation 3 and Equation 4, it is ensured that the impedance at nodes C through N, looking in the direction of the transmission path from the respective ones of nodes C through node N to antenna 180, equals the impedance at node B looking in the direction of the transmission path from node B to antenna 180. Thus, the same matching network (inductor 222-1, secondary winding 210S and capacitor 211) operates to provide impedance matching from each of nodes C through N to the transmission line connect 158 connecting to antenna 180. As a result, the topology of FIG. 2 is scalable to multiple transmit nodes. Thus, using the approach described above, multiple transmitters may be connected to transmit via a same antenna. Insertion loss incurred using the approach may be less than in the prior approach noted above.

In time slots in which the receiver of transceiver 110-1 is to receive (i.e., in a receive time slot), switch 216 is open and switch 215 is closed. The operation of the switches of coupling block 150 corresponding to slots in which the other receivers (receivers of transceivers 110-2-110-N) receive corresponding signals from antenna 180 is identical to that noted above with respect to transmit time slots.

3. Alternative Techniques

Figure 6:
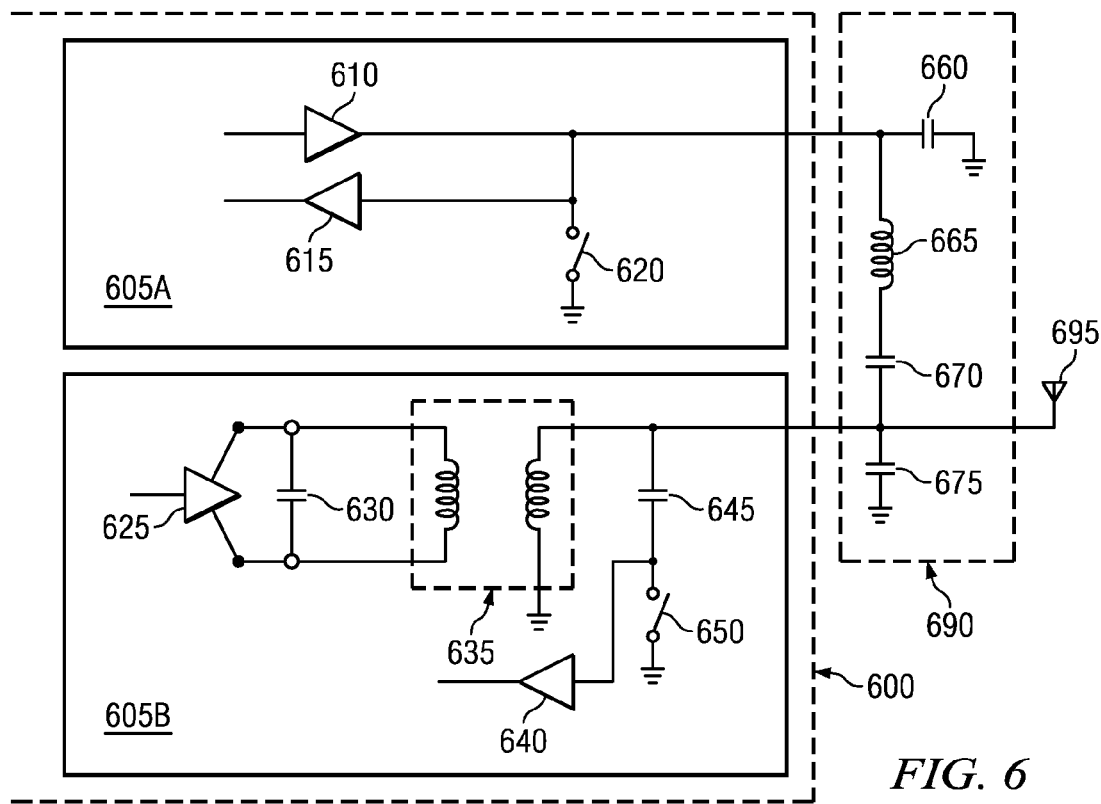
FIG. 6 is a diagram illustrating the manner in which two transceivers are connected to transmit and receive via a same antenna, in an alternative embodiment.

FIG. 6 is a diagram illustrating the manner in which two transceivers are connected to transmit and receive via a same antenna, in an alternative embodiment. Transceivers 605A and 605B of FIG. 1 are shown in FIG. 6. Components 610 and 615 respectively represent the power amplifier and LNA of the transmitter and receiver portions of transceiver 605A. Other components of the transmit and receive signal chains of transceiver 605A are not shown in FIG. 6. Switch 620 is also shown contained in transceiver 605A. Component 625 represents the power amplifier of the transmitter of transceiver 605B, and provides a differential output. Component 640 represents a front-end LNA in the receiver of transceiver 605B. Capacitors 630 and 645, balun 635, and switch 650 are also shown contained in transceiver 605B. Transceivers 605A and 605B may be implemented in IC 600, with the rest of the components and blocks of FIG. 6 being implemented external to IC 600. Block 690 represents a coupling network, and is shown containing capacitors 660, 670 and 675, and inductor 665. Antenna 695 is also shown in FIG. 6. In an embodiment, transceiver 605A is a bluetooth transceiver, and transceiver 605B is a WLAN transceiver. The transmitters and receivers of transceivers 605A and 605B operate according to TDMA techniques.

Capacitor 670 is a DC-blocking capacitor. Capacitor 660, inductor 665 and capacitor 675 form a pi-network used to connect transceivers 605A and 605B to antenna 695. In transmit time slots of transceiver 605B (i.e., when the transmitter of transceiver 605B is to transmit), switches 620 and 650 are closed. In receive time slots of transceiver 605B (i.e., when the receiver of transceiver 605B is to receive), switch 620 is closed and switch 650 is open.

In transmit and receive time slots of transceiver 605A, switch 620 is open. The pi-network formed by capacitor 660, inductor 665 and capacitor 675 is designed to operate as a matching network for transceiver 605A.

Figure 7:
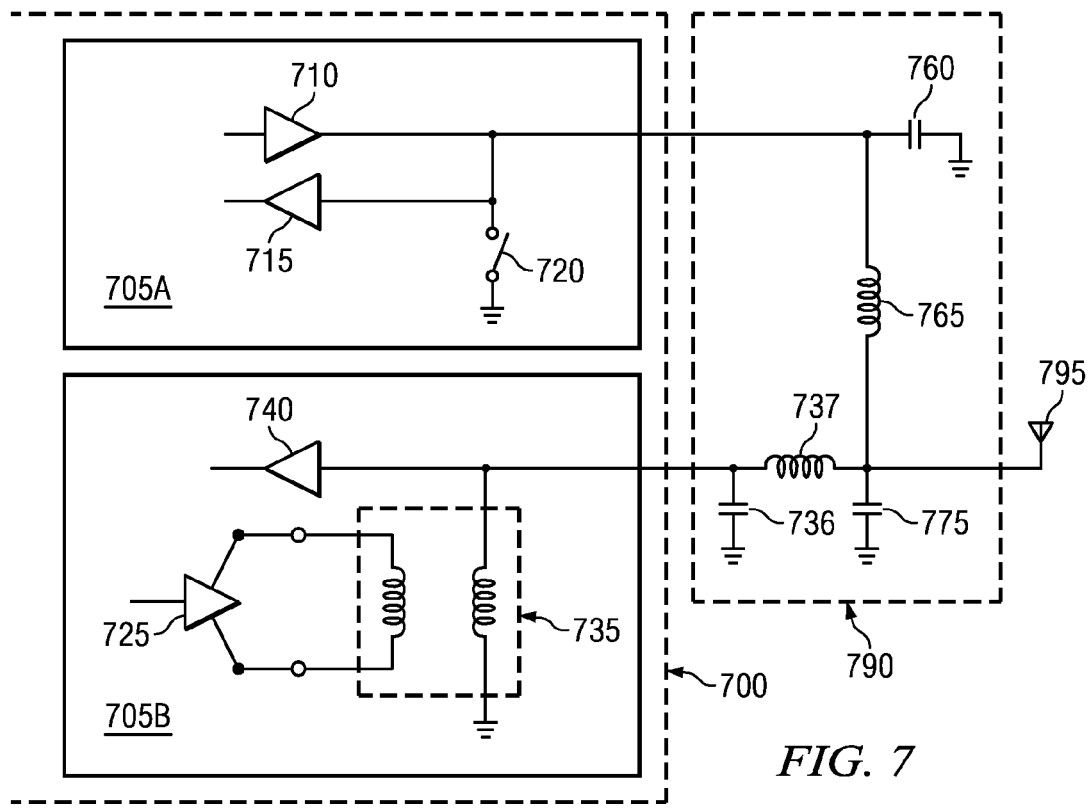
FIG. 7 is a diagram illustrating the manner in which two transceivers are connected to transmit and receive via a same antenna, in another embodiment.

FIG. 7 is a diagram illustrating the manner in which two transceivers are connected to transmit and receive via a same antenna, in yet another embodiment. Transceivers 705A and 705B of FIG. 1 are shown in FIG. 7. Components 710 and 715 respectively represent the power amplifier and LNA of the transmitter and receiver portions of transceiver 705A. Other components of the transmit and receive signal chains of transceiver 705A are not shown in FIG. 7. Switch 720 is also shown contained in transceiver 705A. The transmitters and receivers of transceivers 705A and 705B operate according to TDMA techniques.

Component 725 represents the power amplifier of the transmitter of transceiver 705B, and provides a differential output. Component 740 represents a front-end LNA in the receiver of transceiver 705B. Balun 735 is also shown contained in transceiver 705B.

Block 790 represents a coupling network, and is shown containing capacitors 736, 775 and 760, and inductors 737 and 765. Antenna 795 is also shown in FIG. 7. In an embodiment, transceiver 705A is a bluetooth transceiver, and transceiver 705B is a WLAN transceiver. In an embodiment, transceivers 705A and 705B are implemented in IC form (in IC 700), with the rest of the components and blocks of FIG. 7 being implemented external to IC 700. However, in other embodiments, all the components and blocks of FIG. 7, except antenna 795 may be implemented in IC form.

Capacitor 760 is a DC-blocking capacitor. In transmit and receive time slots of transceiver 705A, switch 720 is open, and transceiver 705A transmits or receives from/to antenna 795 via inductor 765. The connections formed by components 735, 736, 737 and 775 operates as a high impedance network to signals transmitted and received by transceiver 705A, and therefore do not affect the operation of transceiver 705A.

In transmit and receive time slots of transceiver 705B, switch 720 is closed. Transmitter and receiver of transceiver 705B respectively transmit and receive via the pi-network formed by capacitor 736, inductor 737 and capacitor 775. Capacitor 775 and inductor 765 are parallel-tuned, and the connections formed by components 735, 736 and 737 provide impedance matching to match transceiver 705B to antenna 795.

While in the illustrations of FIGS. 2, 6 and 7, although terminals/nodes are shown with direct connections to various other terminals, it should be appreciated that additional components (as suited for the specific environment) may also be present in the path, and accordingly the connections may be viewed as being electrically coupled to the same connected terminals. In the instant application, power and ground terminals are referred to as constant reference potentials.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:
1. A device comprising:
   an antenna;
   a first transmitter to generate a first transmit signal on a first output node, a first coupling network that includes a transformer having a primary winding coupled to the first output node and a secondary winding coupled to the antenna;
   a second transmitter to generate a second transmit signal on a second output node, the second output node being coupled to the antenna via a series connection of a second coupling network and at least a portion of the first coupling network that includes the transformer secondary winding, the first transmitter and the second transmitter operating according to time-division multiple access (TDMA) techniques; and
   the first coupling network including:
   a first capacitor having a first terminal and a second terminal, the first terminal of the first capacitor is coupled to the antenna and a first terminal of the secondary winding of the transformer;
   a first switch coupled between the second terminal of the first capacitor and a constant reference potential; and
   a second switch is coupled between a second terminal of the secondary winding of the transformer and the constant reference potential.

2. The device of claim 1 in which the first transmitter includes a first transceiver, and the second transmitter includes a second transceiver, the first transceiver further including a first receiver, and the second transceiver further including a second receiver, the first receiver is coupled to the first output node and receives a first receive signal from the antenna via the first network, and the second receiver is coupled to the second output node and receives a second receive signal from the antenna via the series connection of the second coupling network and the at least a portion of the first network that includes the transformer secondary winding, the first transmitter, the second transmitter, the first transceiver and the second transceiver operating according to TDMA techniques.

3. The device of claim 1, in which the second coupling network includes:
- a third switch coupled between the second output node and the constant reference potential;
- a first inductor having a first terminal coupled to the second output node;
- a second capacitor having a first terminal coupled to a second terminal of the first inductor;
- a fourth switch coupled between a second terminal of the second capacitor and the constant reference potential; and
- a second inductor having a first terminal coupled to the first terminal of the second capacitor and a second terminal coupled to the second terminal of the secondary winding of the transformer.

4. The device of claim 3 in which in transmission time slots of the first transmitter, each of the first switch and the second switch is closed, and in which in receive time slots of the first receiver, the first switch is open and the second switch is closed, in transmission time slots of the second transmitter as well as receive time slots of the second receiver, the first switch is closed, the second switch is open, the third switch is open and the fourth switch is closed.

5. The device of claim 4 including:
- a third transmitter to generate a third transmit signal on a third output node, the third output node being coupled to the antenna via a series connection of the third coupling network, a portion of the second coupling network and at the least a portion of the first coupling network that includes the transformer secondary winding the first transmitter, the second transmitter and the third transmitter operating according to TDMA techniques.

6. The device of claim 5 in which the third coupling network includes:
- a fifth switch coupled between the third output node and the constant reference potential;
- a third inductor having a first terminal coupled to the third output node;
- a third capacitor having a first terminal coupled to a second terminal of the third inductor;
- a sixth switch coupled between a second terminal of the third capacitor and the constant reference potential; and
- a fourth inductor having a first terminal coupled to the first terminal of the third capacitor, and a second terminal of the fourth inductor is coupled to the second terminal of the second capacitor.

7. The device of claim 6 in which a series circuit formed by a capacitance of the second capacitor and an inductance of the second inductor exhibits series resonance in a frequency band occupied by the third transmit signal, and in which a parallel circuit formed by a capacitance of the third capacitor and an inductance of the first inductor exhibits shunt resonance in a frequency band occupied by the third transmit signal.

8. The device of claim 7, further including a plurality of transmitters, each transmitter in the plurality of transmitters generating a corresponding transmit signal on a corresponding output node coupled to the antenna via a series connection of a corresponding coupling network and portions of one or more other coupling networks including the at least a portion of the first coupling network that includes the transformer secondary winding, the corresponding coupling network is implemented identical to the third coupling network, and in which the first transmitter, the second transmitter and the transmitters in the plurality of transmitters operate according to TDMA techniques.

9. The device of claim 8 in which each of the plurality of transmitters is contained in a corresponding transceiver, and the corresponding transceiver also contains a receiver.

10. The device of claim 7 including a processor operable to generate data to be transmitted in the form of the first transmit signal, the second transmit signal, the third transmit signal and the corresponding transmit signal, the processor also operable to generate control signals for closing and opening of the first switch, the second switch, the third switch, the fourth switch, the fifth switch and the sixth switch.

11. A circuit for connecting multiple transmitters to an antenna, the circuit comprising:
- coupling networks including a first coupling network and a second coupling network, in which the first coupling network includes:
  - a transformer, in which a primary winding of the transformer is coupled to receive an output of a first transmitter;
  - a first capacitor, in which a first terminal of the first capacitor is coupled to the antenna and a first terminal of a secondary winding of the transformer;
  - a first switch, in which the first switch is coupled between a second terminal of the first capacitor and a constant reference potential; and
  - a second switch, in which the second switch is coupled between a second terminal of the secondary winding of the transformer and the constant reference potential,
- in which the second coupling network includes:
  - a third switch coupled between a first output node of a second transmitter and the constant reference potential;
  - a first inductor, in which a first terminal of the first inductor is coupled to the first output node;
  - a second capacitor, in which a first terminal of the second capacitor is coupled to a second terminal of the first inductor;
  - a fourth switch coupled between a second terminal of the second capacitor and the constant reference potential; and
  - a second inductor, in which a first terminal of the second inductor is coupled to the first terminal of the second capacitor, a second terminal of the second inductor being coupled to the second terminal of the secondary winding of the transformer.

12. The circuit of claim 11, in which in transmission time slots of the first transmitter, each of the first switch and the second switch is closed, in which, in transmission time slots of the second transmitter, the first switch is closed, the second switch is open, the third switch is open and the fourth switch is closed.

13. The circuit of claim 11, in which the second terminal of the first capacitor is coupled to an input of a first receiver, in which in receive time slots of the first receiver, the first switch is open and the second switch is closed, in which the first output node is coupled to an input of a second receiver, the first switch is closed, the second switch is open, the third switch is open and the fourth switch is closed.

14. The circuit of claim 13, including a third coupling network including: a fifth switch coupled between a second output node of a third transmitter and the constant reference potential; a third inductor, in which a first terminal of the third inductor is coupled to the second output node; a third capacitor, in which a first terminal of the third capacitor is coupled to a second terminal of the third inductor; a sixth switch coupled between a second terminal of the third capacitor and the constant reference potential; and a fourth inductor, in which a first terminal of the fourth inductor is coupled to the first terminal of the third capacitor, a second terminal of the fourth inductor being coupled to the second terminal of the second capacitor, and in which in transmission time slots of the third transmitter, each of the fifth switch and the second switch is open, and each of the first switch, the third switch, the fourth switch and the sixth switch is closed.

15. The circuit of claim 14, in which a series circuit formed by a capacitance of the second capacitor and an inductance of the second inductor exhibits series resonance in a frequency band occupied by transmission of the third transmitter, and in which a parallel circuit formed by a capacitance of the third capacitor and an inductance of the first inductor exhibits shunt resonance in a frequency band occupied by transmissions of the third transmitter.

16. The circuit of claim 15, including a plurality coupling networks identical to the third coupling network.

17. The circuit of claim 15, in which the first transmitter, the second transmitter and the third transmitter operate according to time-division multiple access (TDMA) techniques.

18. A circuit comprising:
   an antenna;
   a first transceiver including a first transmitter and a first receiver, a first node coupled to each of an output of the first transmitter and an input of the first receiver;
   a second transceiver including a second transmitter and a second receiver, a second node coupled to an output of the second transmitter via a transformer, the second node coupled to an input of the second receiver via a first capacitor;
   a first switch and a second switch; and
   a coupling network including a second capacitor, a third capacitor, a fourth capacitor and an inductor, in which the antenna is coupled to the second node, in which the first node is coupled to the antenna via a series arrangement of the fourth capacitor and the inductor, in which the fifth capacitor is coupled between the first node and a constant reference potential, and the third capacitor is coupled between the second node and the constant reference potential, in which, in transmission time slots of the second transmitter, each of the first switch and the second switch is closed, in which, in receive time slots of the second receiver, the first switch is closed and the second switch is open, and in which, in transmission time slots of the first transmitter as well as in receive time slots of the first receiver, the first switch is open.

19. The circuit of claim 18, in which the first transmitter, the first receiver, the second transmitter and the second receiver operate according to time-division multiple access (TDMA) techniques.

20. A circuit comprising:
   an antenna;
   a first transceiver including a first transmitter and a first receiver, a first node coupled to each of an output of the first transmitter and an input of the first receiver;
   a second transceiver including a second transmitter and a second receiver, a second node coupled to an output of the second transmitter via a transformer, the second node also connected to an input of the second receiver; a switch coupled between the first node and a constant reference potential; and
   a coupling network including a first capacitor, a second capacitor, a third capacitor, a first inductor and a second inductor, in which the antenna is coupled to the second node via the first inductor, in which the first capacitor is coupled between the second node and the constant reference potential, in which the second capacitor is coupled between an input of the antenna and the constant reference potential, in which the second inductor is coupled between the first node and the input of the antenna, in which the third capacitor is coupled between the first node and the constant reference potential, in which, in transmission time slots of the first transmitter as well as in receive time slots of the first receiver, the first switch is open, and in which, in transmission time slots of the second transmitter as well as in receive time slots of the second receiver, the first switch is closed.

21. The circuit of claim 20, in which the first transmitter, the first receiver, the second transmitter and the second receiver operate according to time-division multiple access (TDMA) techniques.

* * * * *